Jan. 31, 1967　　　G. L. BEARER　　　3,301,031
ROLLER LEVELER
Filed June 23, 1964　　　　　　　　　7 Sheets-Sheet 1
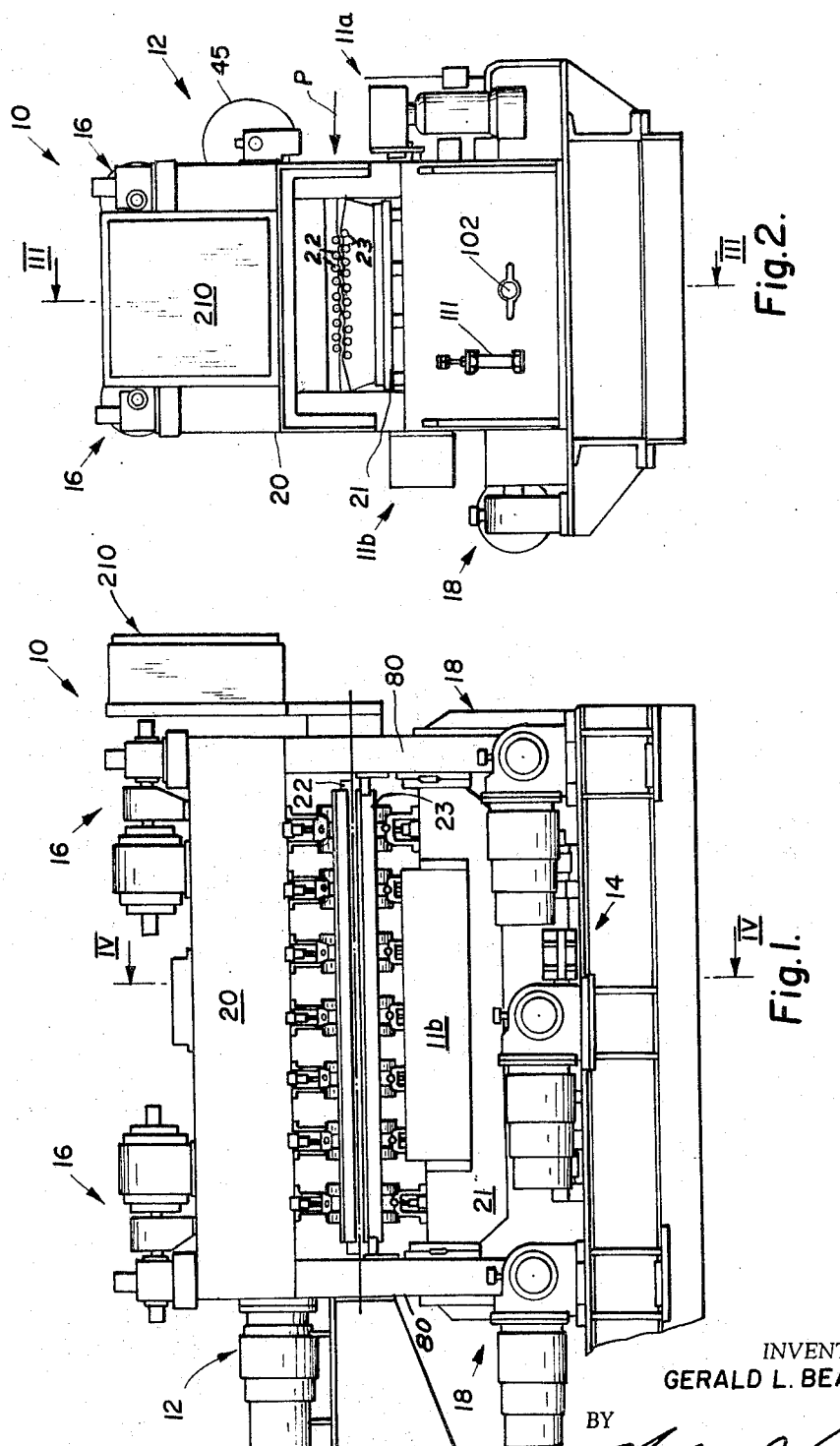
INVENTOR.
GERALD L. BEARER
BY
his ATTORNEY Jan. 31, 1967  G. L. BEARER  3,301,031
ROLLER LEVELER
Filed June 23, 1964  7 Sheets-Sheet 2

INVENTOR.
GERALD L. BEARER
BY
*William J. Ruano*
his ATTORNEY

Jan. 31, 1967 G. L. BEARER 3,301,031
ROLLER LEVELER
Filed June 23, 1964 7 Sheets-Sheet 3

INVENTOR.
GERALD L. BEARER
BY
his ATTORNEY

Jan. 31, 1967 G. L. BEARER 3,301,031
ROLLER LEVELER
Filed June 23, 1964 7 Sheets-Sheet 4
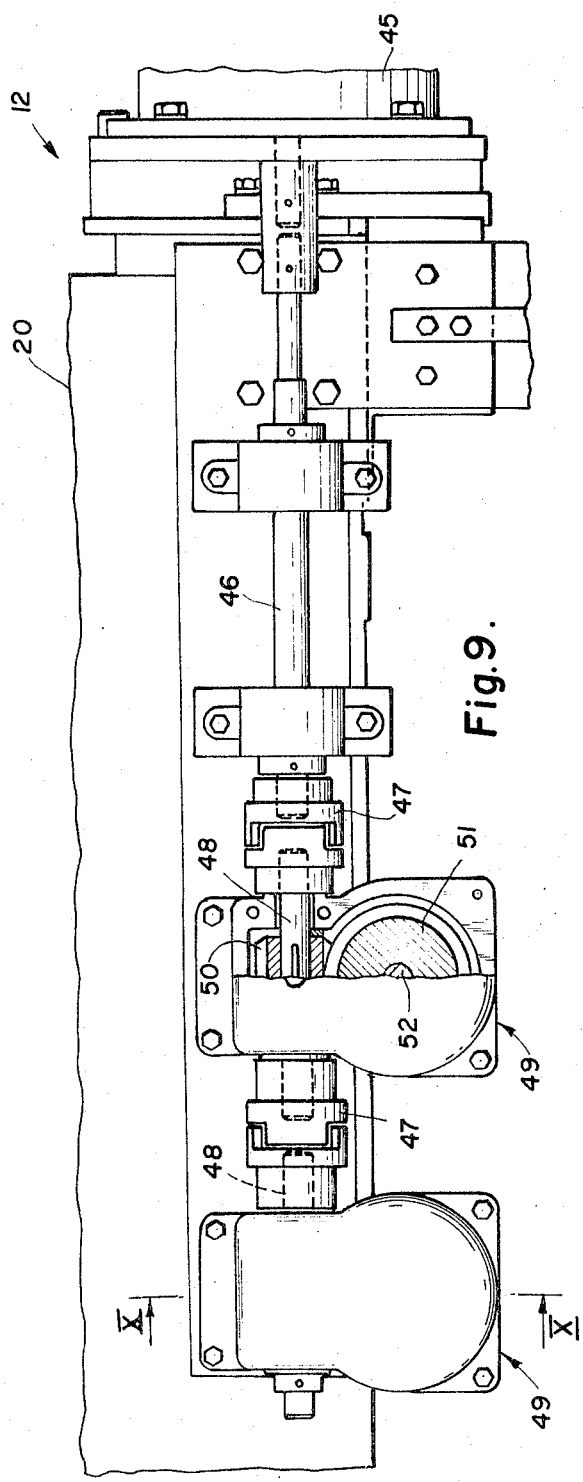
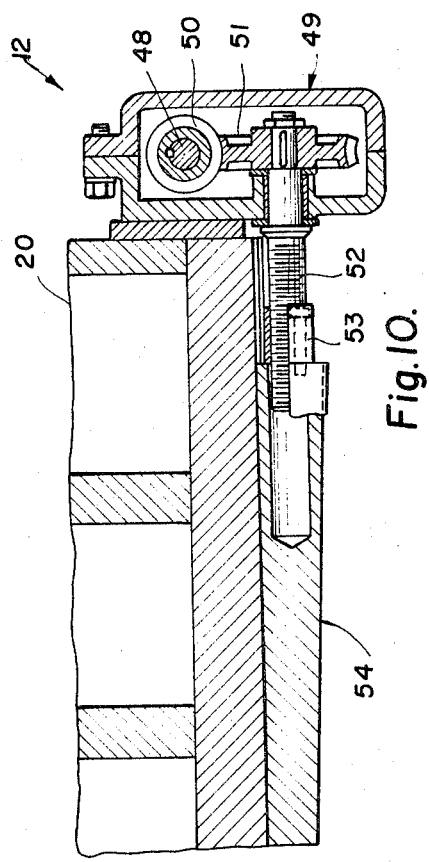
INVENTOR.
GERALD L. BEARER
BY
*William J. Ruano*
his ATTORNEY

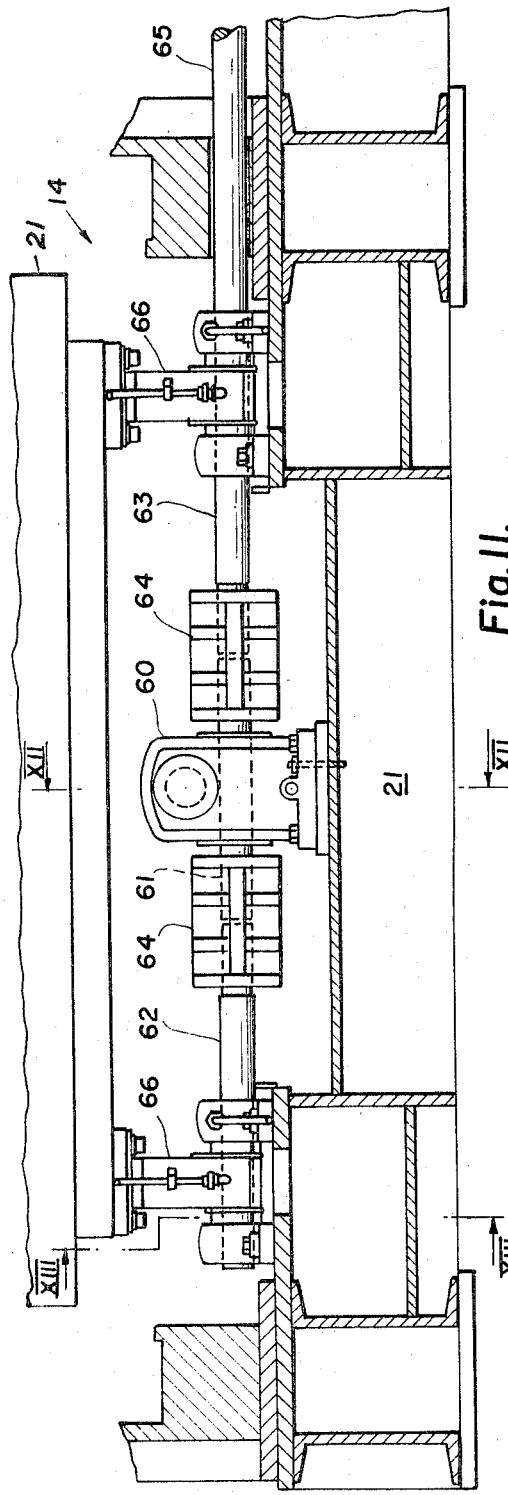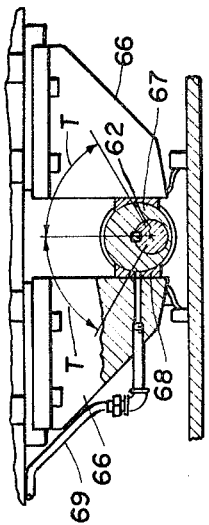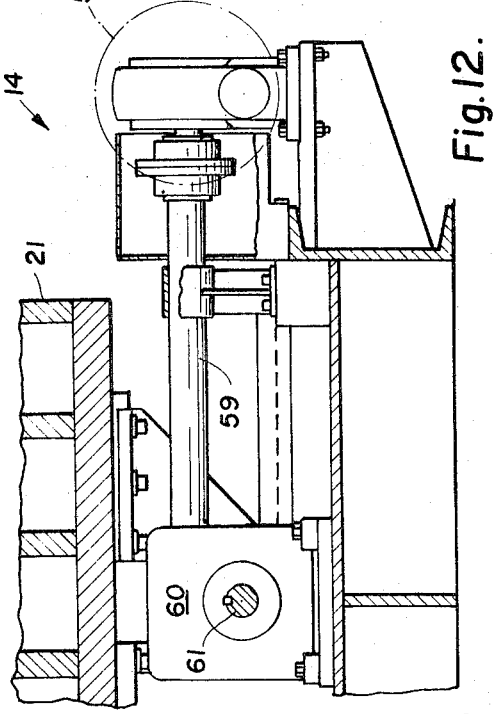

Jan. 31, 1967   G. L. BEARER   3,301,031
ROLLER LEVELER

Filed June 23, 1964   7 Sheets-Sheet 6

INVENTOR.
GERALD L. BEARER
BY
*William J. Ruano*
his ATTORNEY

INVENTOR.
GERALD L. BEARER
BY
his ATTORNEY

United States Patent Office 3,301,031
Patented Jan. 31, 1967

3,301,031
ROLLER LEVELER
Gerald L. Bearer, Mount Lebanon, Pa., assignor to Voss Engineering Company, Pittsburgh, Pa.
Filed June 23, 1964, Ser. No. 377,334
7 Claims. (Cl. 72—164)

This invention relates generally to a machine tool and, more particularly, to a roller leveler for precision flattening or leveling of sheet metal stock or parts, and which is adapted for single sheet operation, as in salvage application, or for continuous strip operation such as in sheet rolling mills. The present invention is an improvement over that shown in U.S. Patent No. 2,365,114 assigned to the present assignee.

An outstanding disadvantage of roller levelers used in the past, such as that shown in the above patent, is that entirely satisfactory means are not provided for roll bend adjustment, that is, for separately deflecting by different amounts the various long, slender work rolls in order to compensate for the shape of the particular plate or stock being rolled.

Another disadvantage has been that required adjustments must be made at various locations of the machine, rather than at one single control point as possible with the present invention.

A still further disadvantage has been that the adjusting means for the lower set of leveling rolls have involved excessive thread loads and have not had sufficiently solid support to withstand abnormal working conditions of the sheet or article rolled, often encountered.

A still further disadvantage has been that suitable indicating means at a single control point have not been provided to give a quick overall indication of various existing adjustments to enable quick and accurate readjustment of different parts of the machine from a central point, as is possible with the present invention.

An object of the present invention is to provide a novel roller leveler which overcome the above named disadvantages of prior devices and which enables easy and quick adjustment and control of various parts from a single control station, including remote control electrical indicating means which will give a visual indication, at the same control point, of various adjustments of the roller leveler so as to enable one to make further adjustments simply and quickly by push button switches or the like.

Other objects and advantages will become more apparent from a study of the following description taken with the accompanying drawings wherein:

FIG. 1 is a front, elevational view of a roller leveler embodying the principles of the present invention;

FIG. 2 is an end elevational view thereof;

FIG. 9 is an elevational view of the roll bend adjustment assembly for the top frame 20;

FIG. 10 is a cross-sectional view taken along line X—X of FIG. 9;

FIG. 11 is a partial, cross-sectional view at the center line of the radial tilt adjustment assembly for rocking the bottom frame 21 and back-up rolls;

FIG. 12 is a cross-sectional view taken along line XII—XII of FIG. 11;

FIG. 13 is a cross-sectional view taken along line XIII—XIII of FIG. 11 showing the eccentric for effecting radial tilt of the bottom frame 21;

Figure 4:
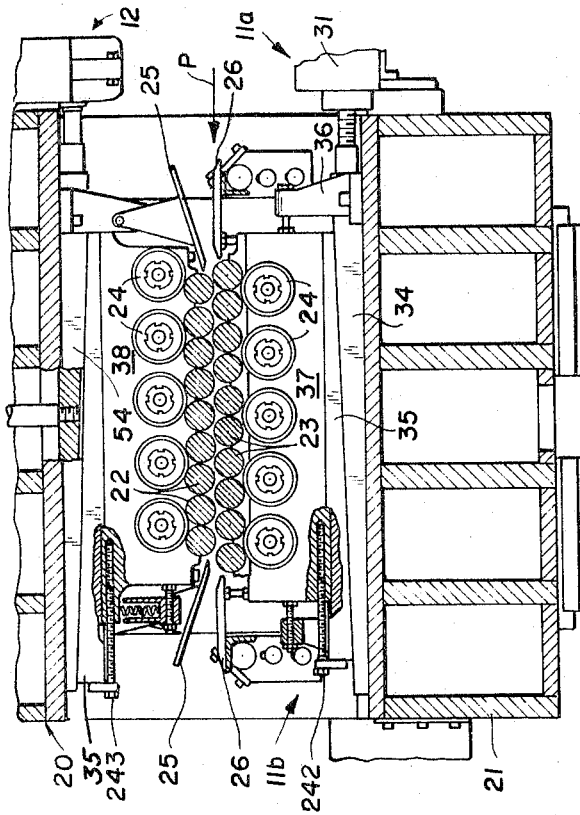
FIG. 4 is a transverse, cross-sectional view taken along line IV—IV of FIG. 1.

Referring more particularly to FIGS. 1 and 2 of the drawings, numeral 10 generally denotes the complete roller leveler machine embodying the present invention and numerals 11a and 11b denote the motor side and control side, respectively, of the lower back-up rollers (independent adjustment). The adjusting assembly for the upper back-up rollers (roll bend) is generally denoted by numeral 12 and shown more specifically in FIG. 10. The radial tilt adjusting assembly is generally denoted by numeral 14 and is shown in more detail in FIGS. 11, 12 and 13. Numeral 16 generally denotes the top frame lift assembly which is shown in more detail in FIGS. 14, 15, and 16. Numeral 18 generally denotes the height adjusting assembly for the bottom frame 21 and bottom rolls and is shown in more detail in FIGS. 17, 18, and 19.

Steel in the form of plates or sheets is introduced into the roller leveler along pass line P between a top set of work rolls 22 and a bottom set of work rolls 23. The top set of rolls is suspended by a rigidly fixed top frame 20, whereas the bottom set is supported by an adjustable bottom frame 21 in a pair of saddles which are slidably mounted at each of the ends of the machine between the four corner posts 80. Thus, the two frames 20 and 21 are held in precise and adjustable relationship with respect to each other by the four massive corner posts 80 so as to resist forces of considerable magnitude developed in flattening operations.

Figure 3:
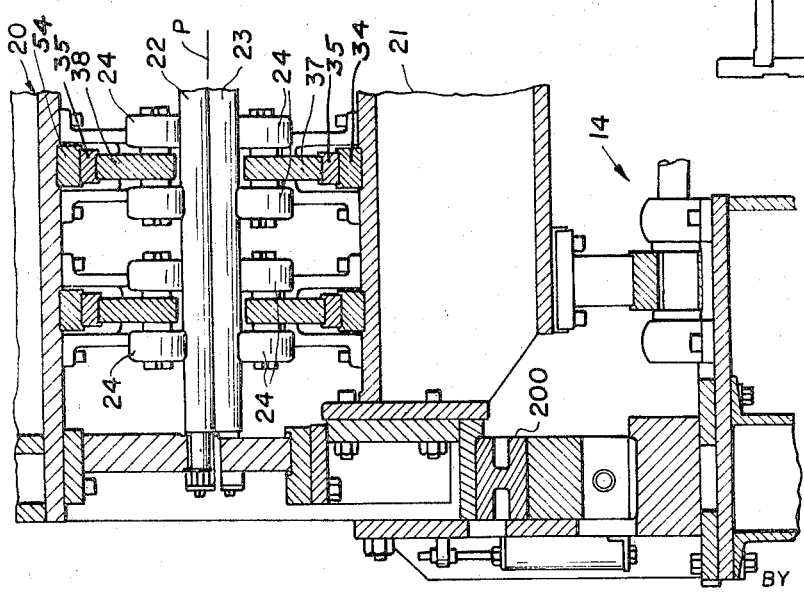
FIG. 3 is a vertical, cross-sectional view taken along line III—III of FIG. 2.

As shown more clearly in FIGS. 3 and 4, the top leveling rolls 22 and the bottom rolls 23 are backed-up by back-up roller assemblies, including back-up rollers 24. The metal sheet or plate to be flattened is guided into the leveling rolls by guards or guides 25, 26 and guided out of the rolls through similar elements.

As shown more clearly in FIGS. 3 and 4, the top and bottom back-up rollers are supported by supports 38 and 37, respectively, which are backed by wedges 35 to permit adjustment in height by rotation of threaded shafts 243 and 242, respectively.

Figure 5:
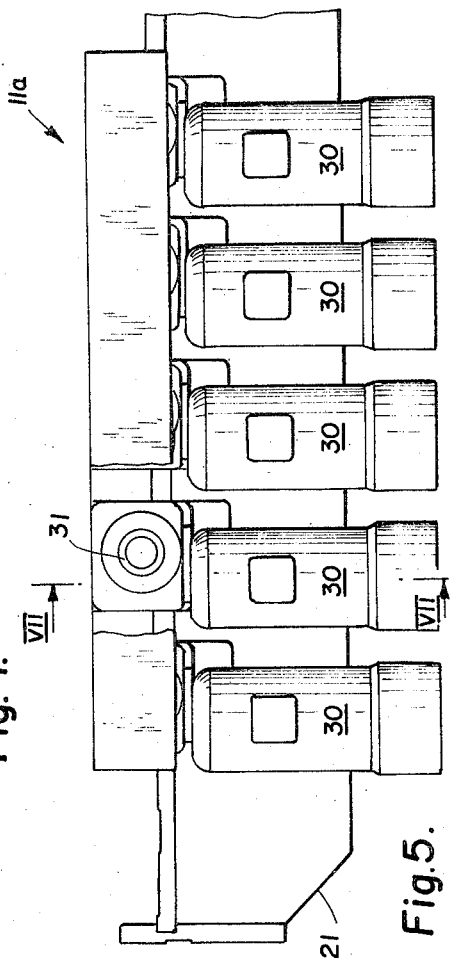
FIG. 5 is an elevational view of the various independent adjustment motors on the side of the machine.
Figure 7:
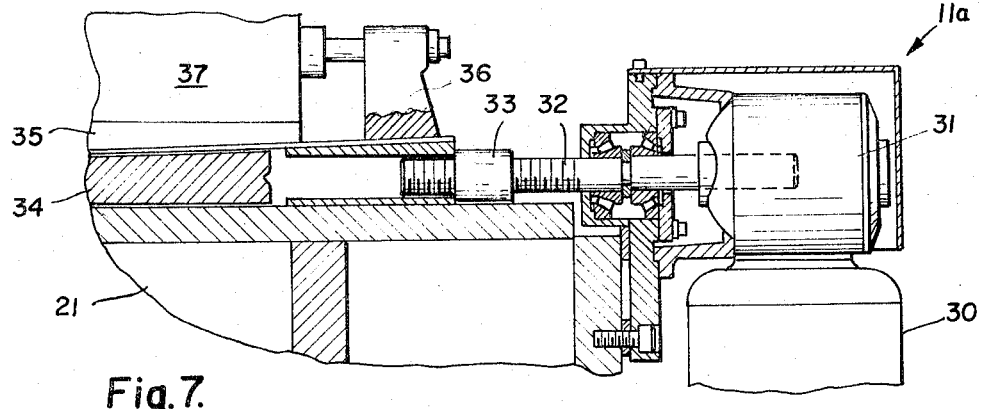
FIG. 7 is a cross-sectional view taken along line VII—VII of FIG. 5.

FIG. 7 shows one of the motors 30 (shown in FIG. 5) which drives a reducer 31 which rotates screw 32 at relatively slow speed so as to propel a threaded nut 33 so as to horizontally slide wedge 34 with respect to the back-up wedge 35 and thereby change the height of the lower back-up roller support 37. A plurality of separate driving motors and adjusting units, such as shown in FIG. 7, are disposed in side-by-side relationship as shown in FIG. 5. Alternatively, motors 30 may be eliminated and screw 32 may be rotated manually by a crank (not shown).

Figure 8:
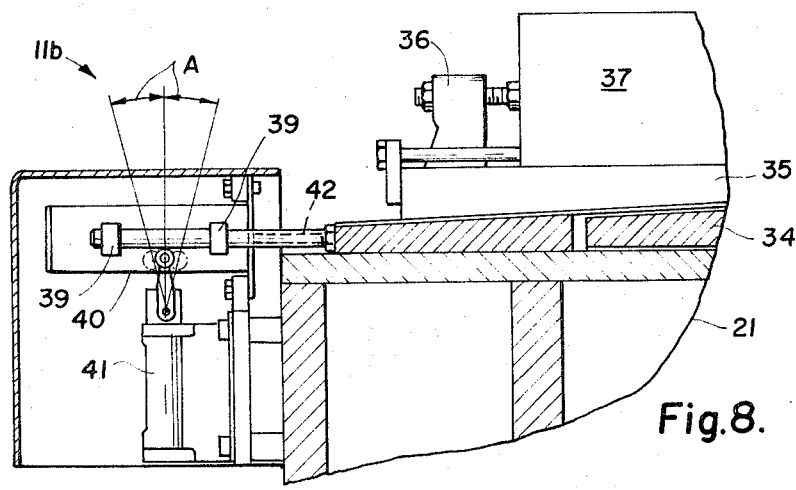
FIG. 8 is a cross-sectional view taken along line VII—VII of FIG. 6.
Figure 6:
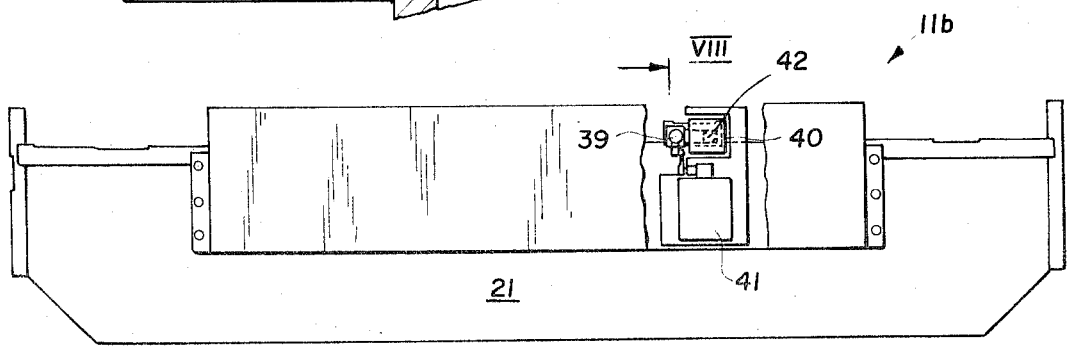
FIG. 6 is an elevational view of the independent adjustment control on the side of the machine.

FIGS. 6 and 8 show a tripper 39 and a postion transmitter rod 42 which operate a safety switch 41 and a position transmitter 40 to provide limit stops for and to indicate movement of wedge 34.

FIGS. 9 and 10 show the roller leveler adjustment assembly 12 at the top of FIG. 4 for adjusting the top back-up rolls, comprising a drive motor 45 which drives a drive shaft 46 and coupling 47 so as to rotate a worm shaft 48 within housing 49 to turn a worm 50 which drives a worm gear 51, which, in turn, rotates screw 52 so as to propel a threaded nut 53, integrally secured to back-up wedge 54, relative to the top frame 20 so as to adjust the vertical position or height of the top back-up rolls 24 and thereby the vertical position of the leveling rolls 22.

A plurality of roller adjustment drives and wedges, such as shown in FIG. 10, are provided, side-by-side, to enable bending of the top rolls 22 with curvature such as convex curvature.

FIGS. 11, 12 and 13 show the radial tilt adjusting means comprising a gear motor 58 which drives a shaft 59 which drives a worm gear reducer 60 so as to rotate couplings 64 and shafts 62 and 63 so as to slowly turn the eccentrics 67 located under bottom frame 21 at the ends of the machine. Each eccentric 67 is located between guides 66 and is fitted between shoe-like bearing plates 68 which are lubricated through pipes 69.

Therefore, as the eccentrics 68 are turned in one direction or in opposite direction through an arc denoted as T, the entire assembly is tilted like a pendulum about an upper pivot point so as to tilt or rock the saddle-mounted bottom frame 21 along the arcuate surface of supports or saddles 200 (see FIG. 18) so as to cause the top and bottom work rolls to come closer together at either the inlet or exit end and correspondingly farther apart at the other end.

Figure 14:
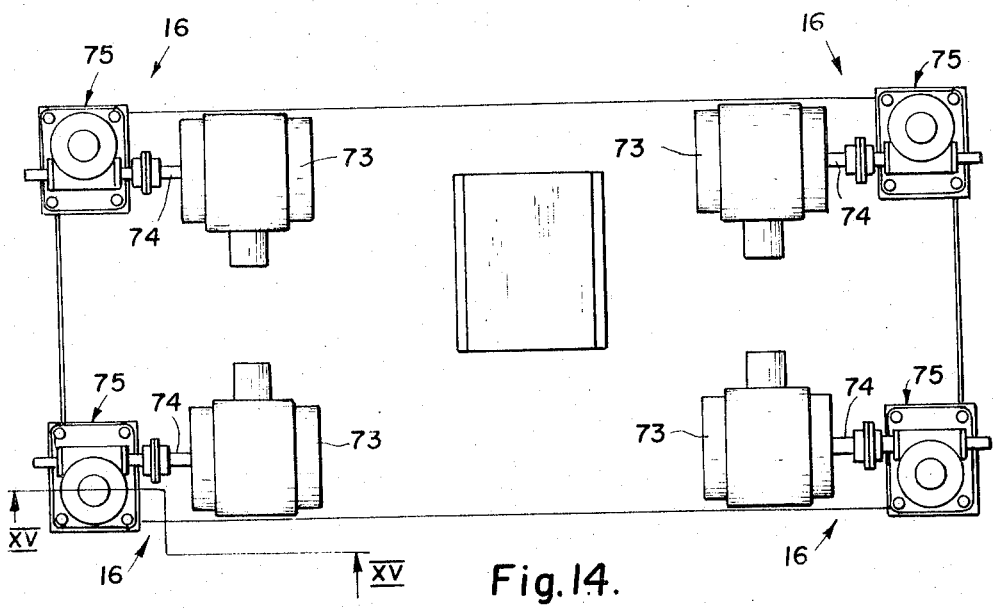
FIG. 14 is a top plan view of the roller leveler showing the top frame lift assembly.
Figures 15, 16:
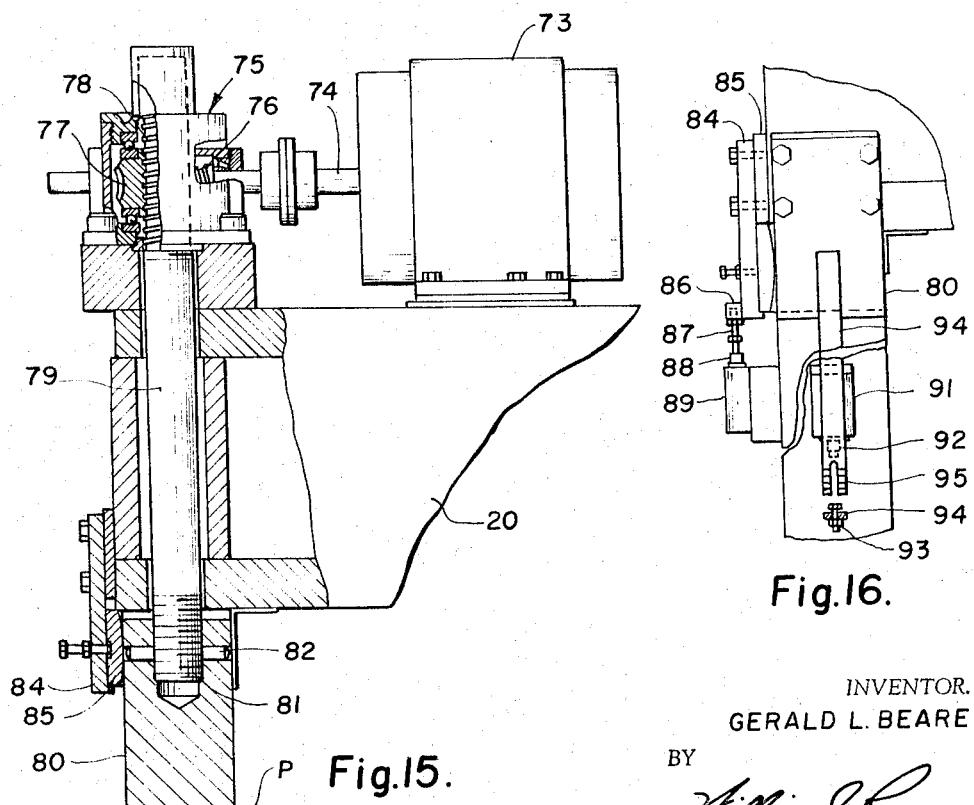
FIG. 15 is an elevational view, partly in cross-section, taken along line XV—XV of FIG. 14.
FIG. 16 is an elevational view showing certain limit stops.

FIGS. 14, 15, and 16 show the top frame lift assembly operated by four lift motors 73, each of which drives a motor shaft 74 which drives a worm gear jack 75 by rotating a worm 76 to drive a worm gear nut 77 causing rotation thereof relative to the partially threaded shaft 79 contained within corner posts 80 into which a threaded portion 81 is thus screwed and held stationary by dowel pin 82, so as to lower and clamp the top frame 20 firmly in position. Upon reverse rotation of the motor, top frame 20 is lifted and unclamped from the corner posts. There is provided a guide plate 84 and mounted therein a wear plate 85.

FIG. 16 shows a block 86 attached to the guide plate 84 and to which is connected an adjusting screw 87 and a contact 88 forming part of a down-limit switch 89. The up-limit switch 91, has a contact 92 and is actuated by an adjustable screw 93 attached to tripper plate 94. The opening indicating notches 95 are a part of tripper plate 94.

Figure 19:
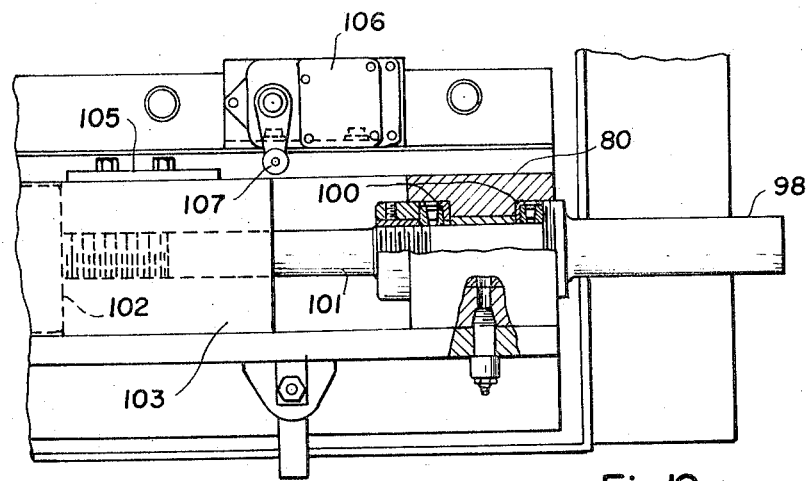
Figure 17:
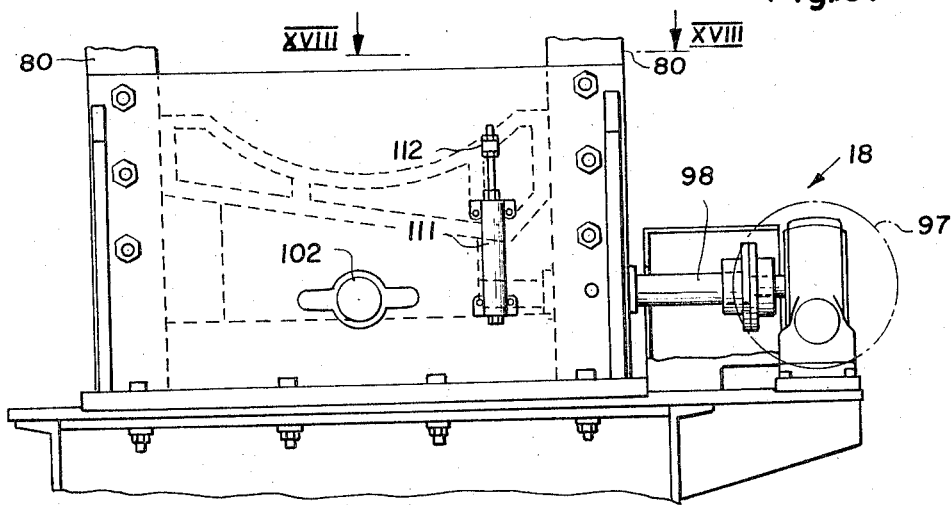
FIG. 17 is an end, elevational view of the height adjusting means for the bottom frame 21.
Figure 18:
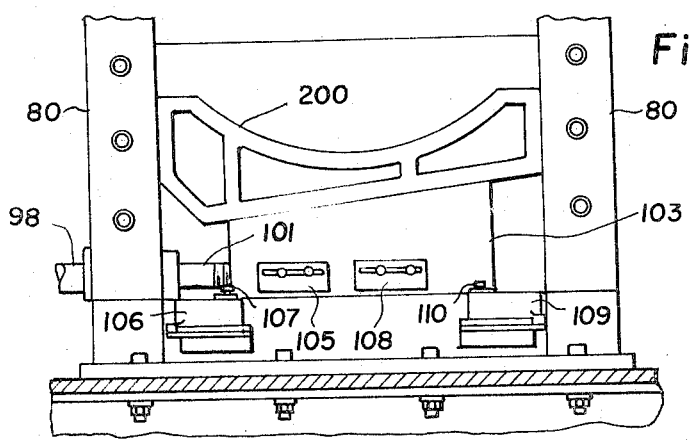
FIG. 18 is also an elevational view of the height adjusting means for the bottom frame 21 but viewed from the opposite or inside position from FIG. 17; and, FIG. 19 is an enlarged view of a portion of the device shown in FIG. 18.

FIGS. 17, 18, and 19 show height adjusting means for the bottom leveling roll assembly which comprises, at each end of the machine, a gear motor 97 which turns a wedge drive screw 98 having a portion in thrust bearings 100 and a driven portion 101 which drives a nut 102 so as to move or propel wedge 103. A tripper 105 operates a limit switch 106 by turning arm 107 to limit up travel of the bottom leveling roll assembly. Another tripper 108 cooperates with a limit switch 109 having an arm 110 to limit down travel of the same assembly. A position transmitter 111 is actuated by arm 112 to provide visual display of the adjusted position of the bottom leveling roll assembly. Thus as wedge 103 is propelled by rotation of threaded shaft 101, the saddle 200 directly supported thereon is adjustably slid vertically between the corner posts 80 so as to adjustably lift or lower the bottom frame 21 and lower back-up rollers.

In operation, and by way of summary, there are four main adjustments to the levelling rolls:

(1) The height adjustment controls the separation of the top and bottom leveling rolls to accommodate various sheet gauges, which is accomplished by raising or lowering the bottom frame 21 at either or both ends of the machine by adjusting the position of wedges 103 against yoke saddles 200 (see FIG. 18) which, in turn, will adjust the position of bottom frame 21 and its back-up rollers. Each end of the bottom frame can be raised or lowered separately, by its individual wedge, to increase or decrease the space between the top and bottom sets of leveling rolls at the corresponding end of the leveler. The space between the leveler rolls is adjusted equally, at both ends of the leveler by operating both motors, in unison. The motors may be operated individually to provide longitudinal tilt adjustment to vary the pressure applied at either edge of the sheet.

(2) The radial tilt adjustment tilts the bottom frame 21 so as to control the pressure applied to the sheet as it enters the leveler, which is accomplished by turning of eccentrics 67 (see FIG. 13) at both ends of the machine so as to rock or slide the arcuate ends of bottom frame 21 along the arcuate top surfaces of saddles 200 (see FIG. 18). The center of rotation corresponds to the center of the central lower roll, having a radius corresponding to that of the curvature of saddle 200.

(3) The roll bend adjustment controls the pressure applied to the edges or center of the sheet. This is accomplished by deflecting the top set of leveling rolls as a unit by adjusting the position of the wedges 54 (see FIG. 10) between the top frame 20 and the top back-up roller supports 38 (see FIG. 4) to vary the pressure on the leveling rolls. Since the wedges at the center of the leveling rolls are tapered more than those at the ends, the leveling rolls are bent into a concave or convex shape.

(4) The independent back-up adjustment controls the pressure applied to various areas of the sheet. This is accomplished by deflecting the bottom set of leveling rolls at selected points by individually adjusting the positions of the wedges 34 (see FIGS. 7-8) between the bottom frame 21 and bottom back-up roller supports 37 (see FIG. 4). Screw 32 may be turned by a gear reducer driven by a hand crank or an A.C. motor. The wedge raises or lowers the associated back-up roller support to apply or relieve pressure to the leveling rolls.

By virtue of the foregoing construction and types of controls or indicators, it is possible to mount all the controls and indicators on a single control panel 210 (see FIGS. 1-2) or on a remotely located console (not shown) since they are all electrical. This convenient concentration of controls and indicators permits efficient operation of the leveler from a central location. Also it enables the operator, at a glance, to observe all existing adjustments and to make needed adjustments easily and quickly from the same control position, instead of requiring him to go from one positon to another on the machine as heretofore required.

Thus it will be seen that I have provided an efficient, inverted type, roller leveler, useful in any leveling or flattening operation requiring precise area control, precision accuracy, low-cost distortion correction, and stretcher-leveler flatness at high production speeds and for working a wide variety of ferrous and non-ferrous alloys; furthermore, I have provided a roller leveler which is rugged and compact in construction and having very ruggedly built adjustments including height adjustment, radial tilt adjustment, roll bend adjustment and independent back-up adjustment; furthermore, I have provided essentially electrically driven adjusting means, controls and indicating means, enabling assembly of all essential indicators and controls on a single control panel whereby all adjustments may be easily and quickly observed from a single location and readjusted at the same location, so as to quickly and accurately control the shape of the sheet or material being rolled or worked.

While I have illustrated and described a single specific embodiment of my invention, it will be understood that this is by way of illustration only, and that various changes and modifications may be made within the contemplation of my invention and within the scope of the following claims.

I claim:

1. In a roller leveler including four vertical corner posts, a top frame and a bottom frame supported by said posts, a top set of rolls and a bottom set of rolls supported by said top and bottom frames, respectively, means between said top frame and top set of rolls to effect vertical adjustment of said top set of rolls, said top frame being rectangular, and four separate jack means, each for lifting and lowering one corner of said top frame relative to a corner post to unclamp or clamp, respectively, said top frame relative to said four corner posts.

2. A roller leveler comprising a top frame and a bottom frame, a top set of rolls and a bottom set of rolls, a top support and a bottom support on which are mounted back-up rollers in contact with said top and bottom rolls respectively, a pair of horizontally disposed, relatively slidable wedges between the top support and the top frame, a second pair of horizontally disposed, relatively slidable wedges between the bottom support and the bottom frame, means for effecting relative sliding movement between said pair of wedges located between the top frame and the top support, and means for effecting relative sliding between said pair of wedges located between the bottom support and the bottom frame, whereby the distance between said rolls may be adjusted, and four vertical corner posts, each including jack means for vertically lifting and lowering said top frame.

3. A roller leveler comprising an upper set of rolls and a lower set of rolls for effecting working of material introduced therebetween, top and bottom back-up rollers, respectively, for said sets of rolls, a bottom frame for supporting said bottom back-up rollers and bottom rolls, said bottom frame having ends with arcuate lower portions engageable with correspondingly shaped arcuate top surfaces on saddles located at both ends of said leveler, said leveler including four corner posts, each saddle extending across two of said posts on each side of the leveler, each saddle having a lower inclined surface, a wedge extending between said two of said posts directly supporting said saddle and being relatively slidable on said lower inclined surface, a separate means at each end of the leveller for horizontally sliding said wedges between their respective posts so as to slide said saddles vertically between said posts and thereby selectively adjust the height of the respective saddles and of said bottom frame.

4. A roller leveler as recited in claim 3 together with limit stop means for limiting the height of said respective saddles.

5. A roller leveler comprising a top frame and a bottom frame, top and bottom back-up roller assemblies, top and bottom wedge means, each comprising a plurality of separately adjustable wedges extending at right angles to said back-up rollers in horizontally spaced relationship across the entire length of said roller assemblies, top and bottom rolls backed up by the top and bottom back-up rollers, respectively, for working sheet metal introduced therebetween, adjusting means for operating each of said top and bottom wedge means for selectively varying the height of said back-up roller assemblies, said adjusting means each comprising an electric drive motor driving through a speed reducer, whereby all of said electric drive motors may be operated from a single control station, each of said wedge means comprising a pair of relatively slidable wedges, one being rigidly secured to the frame and the other, to the back-up roller assembly, each of said pairs of relatively slidable wedges being independently slidable relative to the other pairs of slidable wedges so as to effect bending of said rolls along their lengths.

6. A roller leveler comprising a top frame and a bottom frame for supporting top and bottom rolls, respectively, the bottom frame having ends, which are rockably mounted so as to tilt said bottom frame, an eccentric at each end of said bottom frame, said bottom frame having dependent guides between which said eccentrics are located, drive motor means including speed reducing means for rotating said eccentrics to effect tilting movement of said bottom frame about a central roll of said bottom rolls as a center, whereby the top and bottom rolls will come closer together at one end and farther apart at the other end.

7. A roller leveler as recited in claim 6 together with limit stop means for limiting the extent of tilting movement of said bottom frame in either direction.

References Cited by the Examiner

UNITED STATES PATENTS

| 2,852,065 | 9/1958 | Peterson | 72—164 |
| 2,890,738 | 6/1959 | Koch et al. | 72—165 |
| 2,963,071 | 12/1960 | Kryntzky | 72—160 |

FOREIGN PATENTS 648,617 9/1962 Canada.

CHARLES W. LANHAM, *Primary Examiner.*

R. D. GREFE, *Assistant Examiner.*